United States Patent [19]

Rubens et al.

[11] 4,108,934

[45] Aug. 22, 1978

[54] MOLDING EXPANDABLE THERMOPLASTIC RESINS

[75] Inventors: Louis C. Rubens; Willard E. Alexander, both of Midland, Mich.

[73] Assignee: The Dow Chemical Company, Midland, Mich.

[21] Appl. No.: 669,551

[22] Filed: Mar. 23, 1976

[51] Int. Cl.² ............................................. B29D 27/00
[52] U.S. Cl. ...................................... 264/53; 264/22; 264/54; 264/DIG. 5; 264/DIG. 18; 521/56
[58] Field of Search ................. 264/51, 53, 126, 236, 264/347, 54, DIG. 18, DIG. 5, 22; 260/2.5 B

[56] References Cited

U.S. PATENT DOCUMENTS

| | | | |
|---|---|---|---|
| 2,787,809 | 4/1957 | Stastny | 264/53 |
| 3,259,677 | 7/1966 | Zwick | 264/126 |
| 3,504,068 | 3/1970 | Zizlsperger et al. | 264/126 X |
| 3,562,367 | 2/1971 | Shinohara et al. | 264/25 |
| 3,823,213 | 7/1974 | Stastny et al. | 264/51 |
| 3,992,501 | 11/1976 | Tatzel et al. | 264/126 |

*Primary Examiner*—Philip Anderson

[57] ABSTRACT

Shaped articles of organic polymer resins having cellular (foamed) structure are made from heat-expandable normally solid thermoplastic resin compositions in permeable molds particularly characterized by flooding the mold cavity and the expandable material therein with molten salt as heating medium. For example, a permeable mold, charged with pieces of polyethylene containing azobisformamide and crosslinked by electron irradiation, is immersed into a molten salt eutectic mixture of $KNO_3$, $NaNO_2$ and $NaNO_3$ at about 264° C, removed, cooled and washed with water, thereby forming a coherent, unitary cellular resin molded article completely filling the mold cavity.

14 Claims, No Drawings

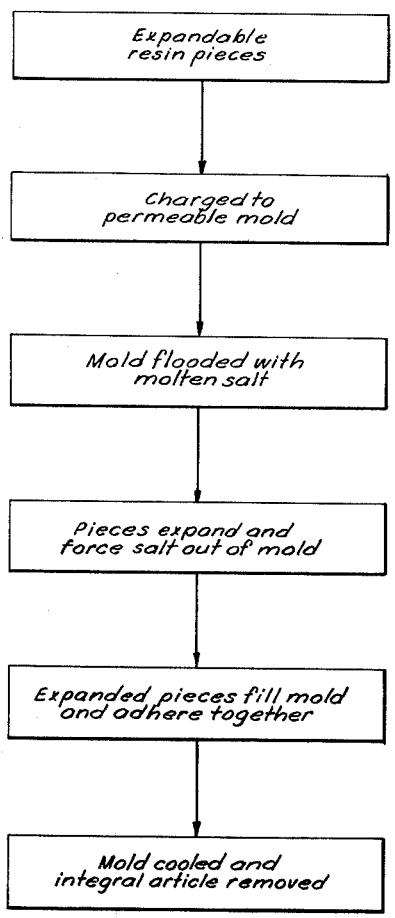

MOLDING EXPANDABLE THERMOPLASTIC RESINS

BACKGROUND OF THE INVENTION

This invention relates to the fabrication of shaped articles of cellular organic resins by heating expandable polymer compositions in molds.

It is well known in the art to make cellular resin products from organic polymer compositions containing blowing agents, and materials, compositions and procedures suitable for the purpose have been described. Techniques have been devised for fabricating such expandable compositions into useful articles having resulting cellular structure. Among such techniques are molding by extrusion of foaming heated masses through shaping die orifices, molding by injection of hot foaming material into closed molds, and compression molding of foamable material in closed molds by heating under pressure followed by release of pressure. Some of these techniques, suc as extrusion, are suitable for making simple shapes such as sheet, plank, cylinders and tubes, but are not suitable for making more intricate, three dimensional shapes.

Of interest in making shaped articles which are intricate in shape and large in size are those techniques called chest or autoclave molding wherein beads of expandable thermoplastic organic polymer material are charged to a mold that is permeable to fluids and wherein steam or hot air is blown into the mold to heat and cause the beads to soften, expand to fill the mold, and fuse together. Variations of such molding have been suggested wherein a permeable mold, charged with expandable thermoplastic resin beads, is submerged in a bath of hot liquid, e.g. hot water or other liquids such as glycerol and aqueous salt solutions, as heating medium. For example, Stastny et al. in U.S. Pat. No. 3,823,213 describe production of moldings of expanded polymers of certain crosslinked olefin polymers in which previously expanded particles of the polymer are confined and heated in closed molds perforated to allow fluid heating medium to enter and gases to escape. Fluid heating media which are mentioned are hot gases or vapors, e.g. hot steam and mixtures of air and steam, or liquids, examples of which are water, glycerol or aqueous (water) solutions of salts or of high boiling liquids which are miscible with water.

Chest molding techniques have conventionally been applied to relatively low softening temperature plastic compositions with volatile liquid blowing agents, such as beads of polystyrene containing pentane. Greater difficulties are encountered when the expansion requires higher temperatures and the use, for example, of higher pressure steam. While high boiling organic liquids can provide higher temperature without use of pressure, they generally have relatively low heat capacity and low heat transfer properties and can adversely affect or contaminate the plastic being molded.

It is an object of this invention to provide improvement in fabrication of shaped articles of cellular thermoplastic resins by heating expandable polymer materials in molds.

A more specific object is to provide said improvement in heating expandable polymer materials in molds permeable to liquid by providing improvement in the liquid heating means, particularly for use at relatively high temperatures.

Other objects and advantages of the invention will become evident from the description that follows.

SUMMARY OF THE INVENTION

The objectives of this invention are attained by method and means of molding heat-expandable thermoplastic polymer material in the form initially of discrete pieces or segments in a mold that is permeable to liquid particularly characterized by heating the same with molten inorganic salt in the mold cavity. As the expandable thermoplastic material expands, it forces the liquid molten salt out of the mold, and the expanding pieces or segments of expandable material fuse together and fill the mold with expanded cellular material. The mold containing the expanded cellular product is then cooled and opened to release the resulting shaped cellular plastic article.

In one mode, the permeable mold containing expandable thermoplastic material is immersed in a body or bath of the molten salt so that the molten salt fills the mold cavity and floods the expandable material. In other modes, one or more streams of molten salt are passed into and through the permeable mold to contact and heat the expandable thermoplastic material therein.

In U.S. Pat. No. 3,562,367 to Shinohara et el. there is described a process for making a foamed thermoplastic resin sheet from a foamable crosslinked olefin polymer resin composition containing a foaming agent by floating a sheet thereof as a single coherent piece of starting material on and above the surface of a heated bath while exposing the sheet from above with heat rays, whereby the sheet is heated and caused to foam freely and without constraint while supported on the liquid surface. A suitable liquid for the purpose is a molten mixture of low melting nitrates exemplified by a mixture of $KNO_3$, $NaNO_3$ and $NaNO_2$. It is not suggested to foam foamable resin material by submersion in a molten salt bath or to cause thereby a plurality of pieces of foamable material to expand and fuse into a coherent cellular body, or to do so in a confining mold capable of producing a complex shaped cellular plastic article.

In general, in practice of the present invention, any expandable plastic composition can be used which expands to cellular structure by a factor of at least about 1.5-fold at the temperature of the molten salt. In some embodiments, the expandable starting material is or comprises a non-cellular composition containing a blowing agent which generates a cellular, foamed structure on heating. In other embodiments, the expandable starting material is one which has a pre-formed cellular structure and which is capable of further expansion on heating. The term "expandable" is used herein to mean starting resin material which either has a pre-formed cellular structure and is capable of further expansion on heating or which is initially substantially non-cellular and contains a blowing agent capable of generating a cellular, foamed resin structure on heating, or has both kinds of structures or is a mixture of such kinds of material.

Also in general, there can be used in practice of this invention any salt or mixture of salts including eutectic mixture of salts which melts to a stable liquid at temperature below the heat-softening temperature of the expandable plastic composition to be molded and which can be heated without decomposition to temperature at least about 50° C or more above the heat-softening blowing temperature of the expandable plastic composition to be molded.

The mold is made of any structural material, preferably of minimum weight and design commensurate with the necessary strength to contain the expanding material to be molded therein, and is provided with small perforations, clearance gaps between separable parts, and/or other openings sufficient in size, number and location to allow ready access and flow of molten salt into and out of the mold cavity, but not large enough to allow the thermoplastic material to flow out of the mold when it expands and fills the mold with cellular material.

The use of molten salt as heating medium in this manner is advantageous because, inter alia, it provides high temperature under atmospheric pressure, high heat capacity, high heat transfer coefficient, no contamination of the molded article, exclusion of air from contact with the hot plastic, and safety in reduced fire hazard relative to organic liquid heating media. It is surprising and unexpected that a loose aggregation of pieces of expandable plastic composition, when heated in molten salt in a permeable mold in accordance with this invention, strongly adhere and weld to each other forming a well-bonded, strong, unitary molded article of cellular structure. It is further surprising and unexpected that the molten salt medium is effectively expelled from the mold and from the interstitial spaces of the starting aggregation of expandable particles, and that practically none of the molten salt is entrapped or occluded within the resulting unitary molded cellular article.

DETAILED DESCRIPTION AND EMBODIMENTS

Figure 1:
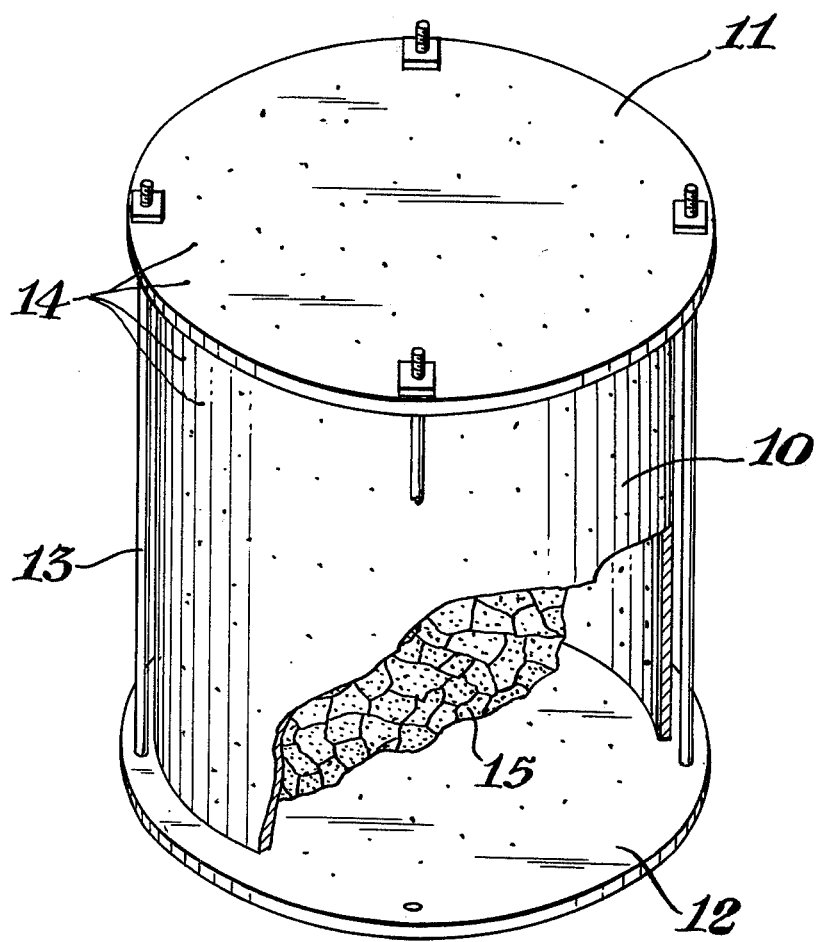
FIG. 1 of the drawing is a sketch of a simple test mold and a cellular resin molding therein, each partially cut away.

Expandable thermoplastic resin compositions suitable for use in accordance with this invention are known per se. Thermoplastic resins of any polymeric chemical structure are suitable provided they have certain physical and mechanical including viscoelastic properties as set out hereinafter. The terms "polymer" and "resin" are used herein in broad generic sense as including natural and synthetic homopolymers and all kinds of copolymers and polymeric materials and mixtures however made or attained whether from monomers or mixtures of monomers or from other polymers or by addition or condensation or substitution or other chemical reaction. Typical such polymers, for purpose of illustration and not of limitation, are those of styrene and substituted styrenes such as ar-chlorostyrene, ar-dichlorostyrene, ar-bromostyrene and other ar-halostyrenes, ar-methylstyrenes, ar-dimethylstyrenes and other ar-alkylstyrenes; of ethylene, propylene, butene-1 and other α-olefins; of vinyl chloride and vinylidene chloride; of vinyl acetate, vinyl propionate, vinyl benzoate and other vinyl esters; of methyl methacrylate and other alkyl esters of acrylic acid, methacrylic acid, maleic acid, etc.; copolymers of two or more such ethylenically unsaturated compounds with each other or with other ethylenically unsaturated compounds copolymerizable therewith such as maleic anhydride, citraconic anhydride, acrylonitrile, methacrylonitrile, divinylbenzene, butadiene, isoprene, allyl methacrylate, ethylene glycol dimethacrylate, acrylic acid, methacrylic acid and the like; poly(2,6-dimethyl-1,4-phenylene)ether and other poly(arylene)ethers; poly(1,4-butylene terephthalate) and other such polyesters; and nylon and other polyamides.

It is essential in the practice of this invention that the polymeric resin component of the foamable or expandable resin composition be normally solid and thermoplastic and that the foamed, cellular product be stable and resistant to thermocollapse at the temperature of the molten salt bath medium used for expansion and molding of the cellular product. By "normally solid" is meant that the constituent polymer resin is solid and firm (as opposed to liquid or grease-like) at normal room temperature, about 25° C. By "thermoplastic" is meant that the constituent polymer resin softens when heated, flows under stress when so heated and softened, and hardens when cooled. By "resistant to thermocollapse" is meant that the cellular structure of gas or vapor bubbles surrounded by thin membranes of resinous plastic and constituting gas cells in a resin matrix retains its integrity at the temperature of molding and resists a tendency for the resin membranes to melt through thereby releasing the gas from the cells and allowing the foam to collapse to a more dense state.

Normally solid resins are readily obtained in the art by selecting the molecular weight and structure of the polymer in accordance with known principles.

An empirical test to determine the thermocollapse resistance of a resin for use in the present invention is carried out as follows. A small piece of the candidate resin is placed on the surface of a molten salt bath at the planned molding temperature. When the resin has reached bath temperature, an attempt is made to pick the resin piece from the bath surface by pinching a bit of the piece in the tip of pointed tweezers and lifting. If the tweezer pulls out, leaving the resin on the bath surface, the resin is, per se, unsatisfactory for the present purposes. A suitable resin can be lifted from the bath surface substantially in one piece when partially nipped in the tweezer tip; the term "self-supporting" at the molten salt temperature is used herein to define a suitable resin which passes the tweezer test.

In order for the cellular material to be resistant to thermocollapse at the molding temperature, the resin matrix at that temperature must have adequate viscoelastic strength without being so rigid or intractable that the resin is not thermoplastic at that temperature and the cells cannot expand. Many thermoplastic normally solid resins characteristically soften at some elevated temperature and above their melting point they become fluid, low viscosity liquids which per se are accordingly not suitable for the present purposes. Means are known to modify such polymer resins to increase the viscoelastic strength of the resin above its melting point temperature. Best results are obtained by building a selected degree of crosslinking into the polymer molecular structure. In addition polymers of ethylenically unsaturated monomers, molecular crosslinks can be obtained by including a poly-ethylenically unsaturated comonomer in the polymerizing monomer mixture; for example, crosslinked polystyrene can be obtained by polymerizing a mixture of styrene and divinylbenzene. Crosslinked condensation polymers can be obtained by using polyfunctional reactants in the reaction mixture.

Crosslinks can also be generated among molecules of preformed non-crosslinked polymers by various means well known to the art, e.g., by heating a polymer with certain peroxides or other chemically reactive crosslinking agents or by irradiating the polymer with penetrating radiation, e.g., high energy electrons (beta-rays), X-rays or gamma-rays, with or without the presence in the starting polymer composition of intimately admixed sensitizers or crosslinking comonomers. Crosslinking of polyethylene for the purpose of obtaining foamed products stable to thermocollapse is described, for example, in U.S. Pat. No. 3,098,831. Suitable crosslinking peroxides, for polyethylene, for example, are dicumyl peroxide, 2,5-dimethyl-2,5-di(tert-butylperoxy)hexane, 2,5-dimethyl-2,5-di(tert-butylperoxy)hexyne-3, tert-butyl perbenzoate and di-tert-butyl peroxide. Some azido compounds such as poly(sulfoazide) are also useful chemical crosslinking compounds. In general, chemical crosslinkers are used in proportions from about 0.001 to about 0.01 gmol thereof per 100 g of polyethylene, for example, for the present purposes.

The degree of crosslinking necessary to obtain the required high temperature viscoelasticity varies somewhat with the kind of starting polymer being crosslinked, the nature of any side reactions such as chain cleavage occurring during crosslinking, and the temperature at which during subsequent foaming the viscoelasticity is required. In general, the extent of crosslinking is correlatable with a decrease in solubility of the polymer in solvents and the formation of gels. Suitable crosslinking for the present purposes usually provides gel content from about 10 to about 80, preferably from about 30 to about 60 percent by weight. "Gel content" is defined as the percentage by weight of the polymer which is insoluble at temperatures above the crystalline melting point of the polymer in a solvent in which the non-crosslinked polymer is soluble at that temperature. In the case of ethylene polymers, gel content may be determined, for example, by heating a weighed sample of crosslinked polymer in toluene at 100° C or in decahydronaphthalene at 130° C and collecting, drying and weighing the insoluble residue fraction.

Thus, in accordance with the known skill of the art, suitable crosslinked thermoplastic polymer resins are provided for use in this invention which are sufficiently thermoplastic to be expanded by the action of blowing agents therein at the temperature of the molten salt bath to form cellular products of the desired density, and which have sufficiently high viscoelastic strength at such molten salt bath temperature to be self-supporting, i.e. to pass the tweezer test hereinbefore described. A few specific examples follow:

Polyethylene having density 0.919 g cc$^{-1}$ and MI 0.82 decigram per minute, irradiated with 4 mrads of electrons at 2 mev, has gel fraction of 60% in decahydronaphthalene at 130° C and is foamable to stable foam at 264° C.

Copolymer of styrene (75 parts), acrylonitrile (25 parts) and divinylbenzene (0.05 part) (by weight) is foamable to thermostable foam at 225° C.

Isotactic polypropylene, mixed with divinylbenzene (0.31 part per 100 parts polypropylene) and irradiated with 3 mrads of high energy electrons, is foamable to thermostable foam at 250° C.

Foamable compositions are made from the starting thermoplastic resins by compounding them with blowing agents in accordance with known art. Volatile liquid and gaseous blowing agents such as pentanes and other volatile hydrocarbon liquids and trifluoro-trichloroethane, dichlorotetrafluoroethane and other volatile fluorocarbon blowing agents are incorporated into the crosslinked polymer composition during the polymerization step or by steeping pieces such as beads of the starting crosslinked polymer with the volatile liquid, under pressure if necessary, until sufficient of the latter has been imbibed to provide subsequent foaming of the plastic polymer. Depending upon the particular volatile liquid used and the amount of foaming desired (foam expansion ratio or density of cellular product), volatile liquids are usually used in proportions of from about 5 to about 30 parts per 100 parts of polymer, by weight.

Solid heat-sensitive, decomposable chemical blowing agents are also well known and useful in accordance with the art, such agents being ones which are thermally stable up to some characteristic temperature called the decomposition temperature at which the particular agent decomposes to generate gaseous decomposition products. When the agent is selected having its decomposition temperature above the polymer resin softening point temperature and is dispersed in finely divided particles in the resin, and the composition is heated, the gaseous decomposition products form gas bubbles and cellular structure in the resin product. Azodicarbonamide (azobisformamide) is commonly used for this purpose, in proportion from about 2 to about 20 parts per 100 parts by weight of polymer resin, and other compounds such as 4,4'-oxybis(benzene sulfonyl hydrazide), dinitrosopentamethylenetetramine, trihydrazino-sym-triazine, and hydrazodicarbonamide are similarly used.

The amount of blowing agent, whether volatile liquid or gas, or heat-sensitive decomposable chemical blowing agent, incorporated in the heat-expandable starting resin composition is selected as known in the art to provide the desired overall, average density in the resulting molded cellular article, which can range from about 2 to about 50 pounds per cubic foot (pcf), corresponding to from about 0.032 to about 0.8 g/cc.

Solid blowing agents are usually incorporated in the thermoplastic resin before the latter is crosslinked because the intimate admixture and distribution of the finely divided solid particles is then more easily obtained. When a chemical crosslinking agent is used, it and the solid blowing agent are selected so that the temperature at which the chemical crosslinker becomes effective to crosslink the resin is not higher than, and is usually appreciably below, the temperature at which the blowing agent decomposes to generate cell-forming gas, and so that both of such temperatures are well above the heat-plastifying temperature of the resin. Such a mixture is then mechanically worked in a mixer, extruder or mill at temperature above the heat-plastifying temperature of the resin but below the activation temperatures of the additives to disperse the latter uniformly throughout the resin. If desired, the temperature of the mixture can then be raised carefully to activate the crosslinking reaction without causing decomposition of the blowing agent. Alternatively, the resin mixture can be used directly in the foaming step whereby the crosslinking and blowing reactions are caused to occur in immediate succession or concurrently.

When irradiation is employed to crosslink the polymer resin, the solid blowing agent is advantageously incorporated by milling into the heat-plastified resin before crosslinking, and the resulting mixture is then irradiated, e.g. by high energy electrons.

In some embodiments of the invention as herein described, cellular resin molded articles are made from starting pieces of expandable thermoplastic resin material which already have cellular structure. Such material is obtained by any means such as those already known to the art. Foamable compositions in form of small particles are foamed by heating in air or steam, for example, to obtain foamed beads in manner described in U.S. Pat. No. 3,823,213 by Stastny et al. Suitable pieces of foamed material are also obtained from larger bodies of pre-foamed material, e.g. from foam sheet or plank, by cutting or chopping.

Subsequently non-cellular starting material is similarly prepared as pieces by conventional means, e.g. by preparation of beads directly by suspension polymerization process, by molding into granules, by cutting from strands, tapes, sheets or larger masses, or the like.

For use in the molding step described herein, the starting pieces preferably have no dimension smaller than about 1 mm when the such pieces are initially substantially non-cellular and no dimension smaller than about 3 mm when they initially have cellular, pre-foamed structure. At least one dimension of such pieces is advantageously not larger than about 15 mm in the case of substantially non-cellular starting pieces and not larger than about 25 mm in the case of pre-foamed pieces having initial cellular structure. Apart from these limitations, the size and shape of the pieces are dictated only by practical considerations and the design of the mold. Regular and irregular shaped pieces are suitable such as spherical and spheroidal beads, cubes and short cylinders and prisms and broken pieces having equal or nearly equal dimensions along different axes. Elongated pieces are also suitable such as filaments, rods, tapes, strands, ribbons and the like. Sheets of expandable thermoplastic resin are also suitable provided the sheet is entirely accessible to contact with the molten salt heating medium in the molding step. To this end, starting sheets are advantageously molded or cut or slit into lace or net-like structures or carefully folded or otherwise arranged in the mold. Expandable pieces can also be arrayed and interconnected along thin wires or fiber filaments or strands or in grid-like flexible networks whereby such pieces are held in desired spatial distribution in the mold cavity during the salt flooding and foaming step. Such wires, filaments and strands also contribute reinforcement to the resulting molded article.

The molds can be made of any structural material tolerant of the molten salt. Suitable metals are iron, steel, stainless steel and other ferrous alloys, nickel, aluminum, tin, zinc, copper, brass and like alloys.

The molds are designed in accordance with the art to provide shaped articles of desired configuration and to be openable to release the resulting molded articles. In addition, the molds are provided with openings which allow passage of liquids or gases. The openings are sufficient in size, number and location to allow ready flow of molten salt into (and displacement of air from) all parts of the mold cavity and to allow ready flow of molten salt (and any gases or vapors generated by the foaming plastic) from the mold as the expandable plastic material subsequently expands by heat of the salt bath to fill the mold cavity. Openings in the order of about 0.5 to about 1.5 mm are suitable. These may be in the form of clearance gaps provided between separable parts of the mold or as holes in the side walls of the mold. In some embodiments, all or part of the inner wall of the mold is made of or lined with fine meshed screen. Where a screen inner wall is supported by an outer wall, the holes in the latter can be larger than would be feasible without the liner screen because the screen retains the foaming plastic; during the foaming step the screen liner also facilitates flow of liquid salt and gases between the molded article and the outer wall of the mold to the exit holes and openings in the mold wall.

When the mold is intended to be immersed in the molten salt bath during the foaming step, the number and location of the holes and like openings in the mold wall are provided so that the mold cavity completely and quickly fills on initial immersion in molten salt and drains on subsequent expansion of the expandable resin molding charge. Holes are provided in the uppermost portions of the mold cavity (referring to its attitude in the salt bath immersion) to prevent trapping therein of air initially contained in the mold; holes are also provided in the lowermost portions of the mold cavity (and all other portions of the mold into which an expanding part of expandable plastic advances) to prevent trapping of molten salt in the mold during the resin expanding step.

When the expandable plastic charge is to be heated by molten salt without immersion, the mold is provided with means to pass at least one stream of molten salt, e.g., by gravity or pumping, into the mold cavity quickly to flood the same in addition to the openings hereinbefore described to allow gas and excess molten salt to flow out of the mold cavity as the resin charge expands to fill that cavity. The salt streams can pass through one or more probes initially thrust into the mold cavity and withdrawn as the resin charge expands.

The term "permeable mold" is used herein to mean a mold having the design characteristics and openings therein of the kind, size, location and function as just described.

The test mold illustrated in FIG. 1 of the drawing comprises a tubular shell body 10 and end plates 11 and 12 enclosing a mold cavity. The end plates 11 and 12 are removably held to the body 10 by fastening devices 13. The walls of the mold, i.e. shell body 10 and end plates 11 and 12, are perforated with numerous small holes 14. During a molding operation in the manner herein described, the mold cavity becomes substantially filled with integral cellular resin molded product 15.

Figure 2:
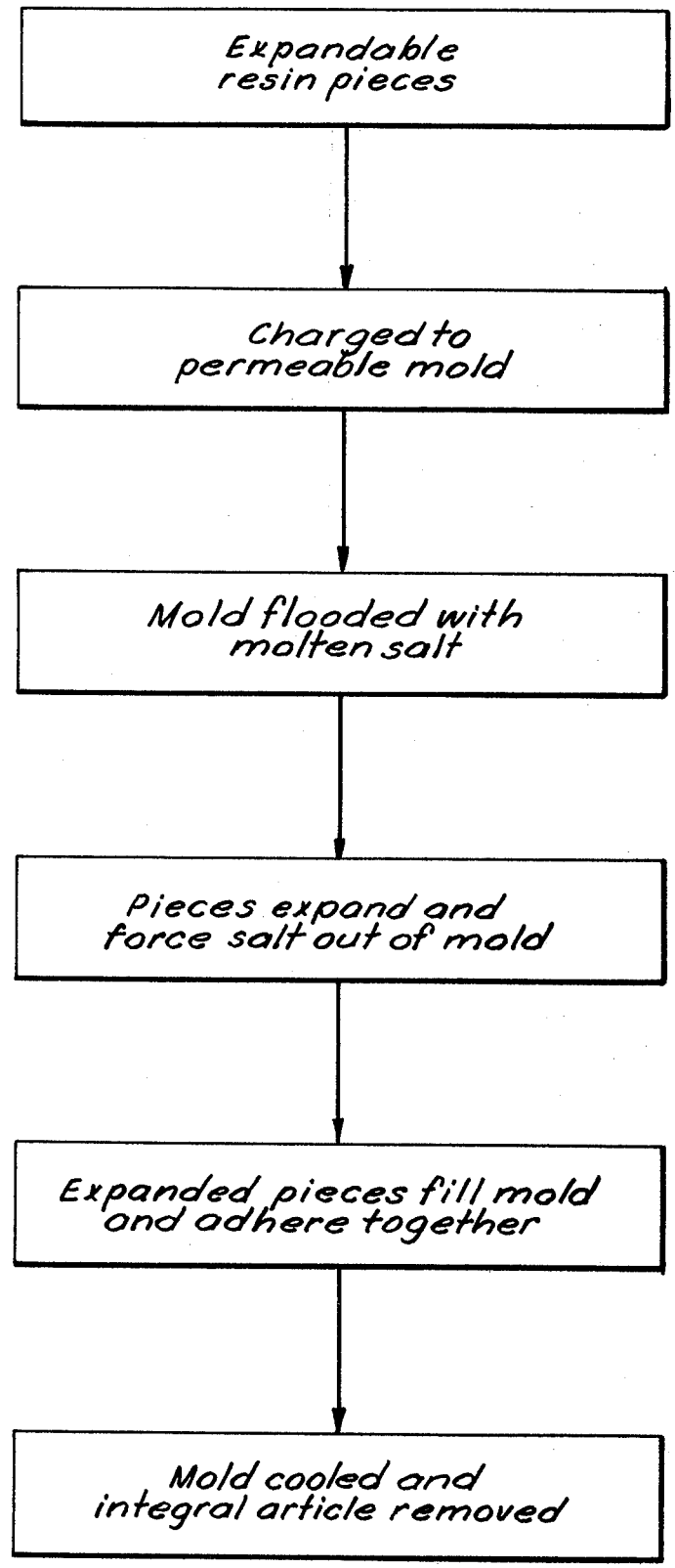
FIG. 2 is a flow sheet of the method of this invention.

The method of making integral shaped articles of resin having a cellular structure from starting pieces of heat-expandable resin in such molds is shown in the flow sheet of FIG. 2 and is more particularly described and illustrated below.

Expandable thermoplastic resin material of the kind hereinbefore described is charged to the permeable mold. The amount of such expandable starting material is selected to fill the mold under the conditions of heating (as will be subsequently described) and produce the desired molded cellular article. The starting material is usually capable of expanding under molding heat conditions at least about 1.5-fold in volume under conditions of free volume expansion, i.e. from 1 volume to at least about 1.5 volumes, when allowed to expand without constraint. Initially non-cellular resin compositions whose resin constituents are capable of high elongation at molding temperature and are compounded with efficient blowing agents are often capable of expanding 30- to 40-fold in volume. At a minimum, the charge of expandable material is such that, on expanding, the pieces of cellular material expand to fill the mold and to press against each other to cause adhesion. In such minimum expansion there may be left some of the initial interstitial and interconnected space, resulting in a partially open-celled cellular structure. Preferably, the charge of expandable material is such that, on expanding, the cellular material substantially closes out the starting interstitial space; i.e. the volume of cellular material on free volume expansion of the expandable resin starting material under the molding temperature conditions is at least as large as the volume of the mold. Usually, the charge of expandable starting material is such that the volume of expanded cellular material which would be obtained by free volume expansion at the temperature of molding would be about 110% or more of the actual mold volume. The resulting confinement of the expanding material in the mold usually results in total filling of the mold, thorough squeezing of molten salt out of the molded article and out of the mold, improved adhesion of the sub-portions of cellular material to one another in the molded article, and accurate reproduction of the mold contours.

The permeable mold, charged with expandable thermoplastic resin as described, is then flooded with molten salt to effect quick, thorough and safe heating thereof.

The molten salt for use in this invention is composed of any salt or mixture of salts which melts at temperature below the softening point temperature of the plastic to be molded, forming a stable liquid which does not decompose at temperature less than about 50° C above that to be used in the molding operation, and is substantially free of normally volatile liquid solvents. Salt compositions melting up to about 200° C are useable. Especially preferred are eutectic mixtures, i.e. mixtures of salts which mutually depress the individual melting point temperatures of the other components. Inorganic salt mixtures are particularly suitable. Typical such compositions and their melting points are:

|  | Composition (mol %) | M.P. (° C) |
|---|---|---|
| $Ca(NO_3)_2$—$KNO_3$—$LiNO_3$ | 8.8-59-32.2 | 117 |
| $Ca(NO_3)_2$—$KNO_3$—$NaNO_3$ | 13-22-65 | 133 |
| $Ca(NO_3)_2$—$KNO_3$—$Mg(NO_3)_2$ | 30.7-64.3-5 | 137 |
| $KNO_3$—$NaNO_2$ | 40-60 | 140 |
| $Ca(NO_3)_2$—$KNO_3$ | 34.2-65.8 | 142 |
| $KNO_3$—$NaNO_2$—$NaNO_3$ | 44-49-7 | 142 |
| $Ca(NO_3)_2$—$LiNO_3$—$NaNO_3$ | 16.5-40.5-43 | 170 |
| $LiNO_3$—$NaNO_3$ | 55-45 | 197 |

Such salt compositions are stable liquids above their melting points up to 500° C or more, well above most expandable plastic resin molding temperatures.

In the practice of this invention, the molten salt is maintained in a suitable vessel and heated in conventional manner to maintain the desired temperature. Usually the apparatus is thermally insulated and provided with usual controls and safety devices for protection of the operating personnel. When the mold charge is to be heated by immersion of the mold cavity, the tank or vat containing the molten salt should, of course, be deep enough to allow such immersion of the mold cavity into the body of molten salt and be sufficiently accessible to enable the mold to be introduced into and removed from the bath. A hood or housing is preferably provided to collect for safe disposition any gases or vapors generated by the bath or during the molding operation. When the mold charge is heated by streams of molten salt passed into the mold cavity, the holding tank or vat containing the reservoir of molten salt is fitted with appropriate pumps, lines and valves to pass the salt stream to the mold cavity and means to collect the salt therefrom and return it to the reservoir.

The volume of molten salt in the bath should also be large enough to minimize the temperature-lowering effect of heating the mold and its expandable plastic contents, and the bath should be provided with adequate heating means to restore the heat and maintain operating temperature. The operating temperature is preferably at least about 40° C up to about 200° C above the melting point or softening point temperature of the expandable plastic being molded and is usually in the range from about 150° to about 350° C. Thus, if the melting/softening point temperature of the starting expandable plastic resin material is 110° C, for example, suitable molten salt bath temperature is usually from about 150° to about 310° C. Materials which soften and expand at higher temperatures require and can tolerate higher temperatures in the molten salt heating and foaming step than do those materials which soften and expand at lower temperatures.

The use of molten salt as heating medium is advantageous for several reasons, as hereinbefore indicated. It provides high temperature at atmospheric pressure. Saturated steam, for example, at 250° C requires pressure of about 560 psig. While high boiling liquids are also useful at atmospheric pressure, they lack the advantageous thermal properties of molten salts. For example, in the table below, these properties are compared at 190° C for ethylene glycol (boils at about 200° C), a silicone oil having 100 centistoke viscosity at 25° C, and a molten salt mixture of 53% $KNO_3$, 40% $NaNO_2$, 7% $NaNO_3$ by weight, melting about 142° C.

| | Properties at 190° C | | | |
|---|---|---|---|---|
| Material | Density g/cc | Viscosity cps | Heat Content (1) Cal/cc | Thermal Conductivity BTU/(ft$^2$)(hr) (° F/ft) |
| Ethylene glycol | 0.98 | 1-2 | 105 | 0.155 |
| Silicone oil | 0.8 | 12 | 49 | 0.074 |
| Salt Mixture | 1.95 | 9 | 152 | 0.350 |

(1) over temperature range 20-190° C.

One sees that the exemplary molten salt has heat content three times that of the silicone oil and 45 percent greater than glycol; thermal conductivity of the molten salt is almost 5 times that of the silicone oil and is more than twice that of glycol. The high heat content of the molten salt means that a smaller temperature drop occurs in the bath when a mold at lower temperatures is immersed therein than occurs with the other bath liquids. The high thermal conductivity of the molten salt means that heat is transferred more rapidly to the mold and expandable plastic material, and also that heat is transferred more quickly from the bath re-heating elements to the molten salt to restore the bath temperature, than is the case with the other bath liquids. The result is more uniform bath temperature and molding conditions, shorter molding cycles, faster bath temperature recovery, and more efficient operation with the molten salt bath as heating medium. Also, the molten salt medium allows wide range of temperature selection, including very high temperatures, with relatively safety from fire hazards; it is noted, for example, that the flash point of ethylene glycol is about 116° C. Further, the organic resin materials being molded are virtually inert, both physically and chemically, to the molten salt liquid heating medium; accordingly, there is no plasticization of the molding resin by absorbed liquid or contamination of the resulting cellular article as sometimes occurs with organic liquid bath media.

Surprisingly, the expanding pieces of expandable resin material in the permeable mold heated by the molten salt heating medium fuse to other such pieces to form a cellular article of unitary structure. Further, the molten salt liquid is thoroughly squeezed out from the interstices among the expanding resin pieces, and substantially none is occluded in the resulting cellular structural article.

As indicated hereinbefore, the starting expandable plastic material is used in pieces that can have many different initial shapes and sizes. When the starting material is initially non-cellular and capable of 30-fold or more expansion, the actual volume of non-cellular starting material may be only a small fraction of the mold volume. When such starting material is in the form of small beads or granules, they tend to float to the upper regions of the mold as the mold cavity is flooded with the dense molten salt. On expansion, such pieces then push downward in the mold. In molds which are relatively deep or complex, especially having walls which define several upper spaces when the mold cavity is flooded with the molten salt, it may be desirable to select the starting material in a form which assists in providing more uniform distribution of the expanding cellular material throughout the whole mold space. To this end, substantially non-cellular expandable starting material is advantageously used in strandular form which is judiciously arranged in the mold to provide better distribution of the expandable material during the expanding step. Similarly, non-cellular starting materials in the form of slit sheet, lace or net-like structures or pieces arrayed on fine wires, filaments or strands are placed in the mold cavity and hold their place during flooding of the mold cavity by the dense molten salt.

Another means to promote more uniform filling of the mold cavity during the salt bath foaming is to charge the mold with expandable plastic starting material which is already pre-expanded and cellular. The ratio of starting, initial volume of such material to the total inner volume of the permeable mold cavity is much larger than when non-cellular starting material is used. In some embodiments, the mold is substantially completely filled with the pre-foamed cellular molding material so that little movement of such material within the mold occurs during the molding step; the expandable material merely expands in place, squeezes out the molten salt, fuses together, and fills the contours of the mold with a resulting cellular molded article.

In other embodiments, the starting expandable plastic material is a combination of non-cellular expandable and pre-foamed cellular material, the latter being either further expandable or not so. Pieces are provided wherein the diverse materials are joined together such as in layers of laminated structure, beads of non-cellular material adhered to beads or strips of cellular material, strands having a cellular core and non-cellular expandable sheath, twinned strands of cellular and non-cellular material adhered along their length or twisted together, and other configurations. One advantage of such combinations is that the starting material, being bulky because of the pre-foamed cellular component, more fully fills the mold in initial charge, thereby minimizing flow and movement of plastic within the mold during the subsequent molding step. Because expandability is provided by the non-cellular expandable component of the starting material, the pre-foamed cellular component of the starting material is not required to be expandable under the molding conditions. Further, the cellular and non-cellular components of the initial starting material can be different also in other ways, e.g. composed of different plastic resins, or compounded to produce cellular structures of different cell size or density, thus producing composite molded cellular articles.

In carrying out the molding step of this invention, a permeable mold, charged with expandable thermoplastic resin, is flooded with molten salt, as hereinbefore described. The salt temperature is preferably at least about 40° C up to about 200° C above the melting or softening point temperature of the expandable plastic resin starting material and is selected in regard to the viscoelastic properties of the resin at the salt temperature so that the resulting cellular structure of the resin is stable and resistant to thermocollapse.

The mold and contents are allowed to remain in contact with the molten salt until expansion of the expandable resin material occurs filling the mold. Usually, the expansion and mold filling occur quickly. With cellular products having good stability and resistance to thermocollapse, longer times in contact with the high temperature salt, e.g. several minutes, are not deleterious, but no advantage is gained by continued heating after the cellular material has expanded and filled the mold.

When the expandable resin material has expanded and filled the mold, the mold is lifted from the bath, if it has been immmersed therein, or the salt stream is discontinued, and the molten salt is allowed to drain from the outside of the mold. When the resulting molded article is capable of retaining its shape, usually after cooling, the mold is opened and the cellular molded article is removed. Cooling is conveniently carried out in air or by water spray or drench. Water wash is also used where desirable to remove traces of salt from the surface of the molded article.

The molding process is conveniently carried out in ordinary air at atmospheric or near atmospheric pressure. If desired, it can be carried out in the presence of inert gas such as nitrogen.

The molding process is carried out in batch fashion, or it can be carried out in continuous manner in apparatus providing a series of permeable molds conveyed successively to a filling station for charging with expandable plastic resin, thence to a molten salt facility for heating, then removed, washed, cooled and opened, the molds being recycled and the resulting molded cellular articles being withdrawn for futher processing, disposal or storage. Elongated articles such as sheets and planks are made in continuous manner by providing the permeable mold in the form of two or more endless belts or chains of mold elements that are brought together and mated to form a moving mold cavity which is continuously charged with expandable resin material which is then carried continuously into and through a molten salt heating facility for foaming within the mold enclosure, the continuous mold elements conveying the resulting foamed cellular article continuously out of the heating zone, after which the several endless mold loops are separated and returned to the starting point, the endless molded cellular articles being collected for further processing as desired.

The following examples illustrate the invention and provide specific embodiments thereof, but are not intended to restrict its scope. All parts and percentages are by weight unless otherwise designated or required by the context.

EXAMPLE 1

On a twin roll compounding mill heated to 150° C, 5 parts of finely divided azobisformamide powder is mixed into 95 parts of molten polyethylene, density 0.919 g/cc, MI 0.82 dg/min (decigram per minute). The mixture is then compression molded at 140° C into sheets 0.125 inch thick which are then cut into 0.125-inch cubes. These cubes are irradiated at room temperature with electrons at 2 mev ($2 \times 10^6$ electron volts) to a total dose of 4 mrads (megarads) resulting in crosslinking. The gel content of the resulting crosslinked polymer is 60%, measured in decahydronaphthalene at 130° C. The crosslinked polyethylene cubes are substantially non-cellular but expandable because the azobisformamide constituent is a thermally decomposable blowing agent.

A trial permeable mold for demonstration purposes is made from steel tubing 6 cm in diameter and 4 cm long, perforated with 0.5 mm diameter holes on 1 cm centers. The ends are closed with imperforate flat sheet steel disks clamped together with the tubing to construct a cylindrical mold having a cavity volume of about 113 cc.

The demonstration permeable mold is charged with 9.4 g of the irradiated, crosslinked expandable polyethylene cubes. The mold is closed and immersed for 30 seconds in a molten salt bath at 264° C. The molten salt is composed of a mixture of 53% $KNO_3$, 40% $NaNO_2$ and 7% $NaNO_3$ melting at about 142° C. Molten salt quickly enters the mold through the perforations and air escapes during the immersion. The expandable cubes expand, and molten salt is forced out of the mold. The mold is removed from the salt bath and cooled by immersion in cold (20° C) water.

On opening, the mold is found to be completely filled with cellular polyethylene in a single, coherent cylinder weighting 9.3 g, having fine cells and average density 0.0822 g/cc (about 5 pounds per cubic foot). The starting cubes have expanded and bonded together without occluding salt from the molten salt bath.

When the experiment is repeated, using a portion of the cubes that have not been irradiated and hence are not crosslinked, the mold is only partially filled with cellular polyethylene and the average density thereof is about 25 pounds per cubic foot because the cellular product partially collapses at the salt bath temperature.

EXAMPLE 2

In the manner described in Example 1, 5 parts of finely divided azobisformamide powder is milled into 95 parts of molten high density polyethylene, density 0.967 g/cc, MI 1.3 dg/min, at 160° C. The resulting mixture is compression molded at 140° C into sheets 0.11 inch thick which are cut into cubes. The cubes are irradiated with 2 mev electrons to total dose of 5 mrads. The resulting crosslinked polymer has gel content of 48% measured in decahydronaphthalene at 130° C.

The demonstration permeable mold of Example 1 is charged with 11 grams of the irradiated crosslinked expandable polyethylene cubes, closed and immersed for 60 seconds in the molten salt bath described in Example 1 at 250° C. The mold is removed from the molten salt bath, cooled and washed in cold water, and opened. A single, coherent cylinder of fine celled structure conforming to the mold cavity is obtained. The molding weighs 10.92 grams, has average density of 0.0966 g/cc (about 6 pounds per cubic foot). The starting cubes have expanded and bonded together without occluding salt from the molten salt bath.

EXAMPLE 3

Beads of polymer about 1.2 mm diameter are obtained by conventional suspension polymerization in aqueous medium using peroxygen catalyst of a comonomeric mixture comprising:

75 parts styrene
25 parts acrylonitrile
0.05 part divinylbenzene (DVB)
20 parts $C_2F_3Cl_3$ (1,1,2-trichloro-1,2,2-trifluoroethane)

The DVB is a di-functional comonomer providing crosslinking in the resulting copolymer and increasing the viscoelasticity thereof at temperature above the softening point. The $C_2F_3Cl_3$ is a latent blowing agent, and the resulting beads are expandable.

To the demonstration permeable mold of Example 1 is charged 6.1 grams of the copolymer beads, the mold is closed and immersed for 5 seconds into the molten salt bath described in Example 1 at 225° C, then removed, cooled and washed in water, and opened. The mold cavity is found to be filled completely with fine celled foam conforming to the mold. The starting beads had expanded and fused to each other forming a unitary cellular cylinder molded article having average density of 0.054 g/cc (about 3.36 pcf).

The test is repeated twice, leaving the charged mold immersed in the molten salt bath for longer times of 25 and 120 seconds, respectively, with the same results. The crosslinked copolymer cellular structure is stable and resistant to thermocollapse at 225° C.

EXAMPLE 4

Expandable crosslinked polystyrene beads containing isopentane blowing agent are made by conventional suspension polymerization in the following manner.

A stirred polymerization reaction vessel is charged with about 216 parts of water containing 0.09% methoxy cellulose (suspension aid) and the following:

95 parts styrene
0.055 part divinylbenzene (DVB)
7 parts isopentane
0.3 part benzoyl peroxide
0.2 part dicumyl peroxide.

The DVB is a crosslinking agent for styrene.

The mixture is stirred at 82° C for 14 hours, then at 150° C for 5 hours, then cooled. The resulting crosslinked polystrene bead product is screened to collect beads having diameters from about 1 to about 2 mm.

To the demonstration permeable mold described in Example 1 is charged 4.6 grams of such beads, the mold is immersed for 5 seconds in molten salt as described in Example 1 at bath temperature 225° C, then removed, washed and cooled in water, and opened. The mold is found to be completely filled with cellular plastic foam conforming to the mold cavity. The molded cylindrical article is strongly bonded together and has average density about 0.04 g/cc.

The test is repeated two additional times with the charged mold being immersed in the molten salt bath for longer periods of 25 and 120 seconds, respectively, with the same results. The crosslinked polystyrene cellular foam structure is stable against thermocollapse in the salt bath at 225° C.

EXAMPLE 5

A mixture of 88 parts polypropylene (isotactic polymer, d 0.901 g/cc, m.pt. 167° C), 0.27 part divinylbenzene (DVB), and 12 parts azobisformamide is prepared in a continuous twin screw mixer at about 177° C, and compression molded into 0.1 inch thick sheets which are subsequently cut into cubes. The cubes are irradiated with high energy electrons to 3 mrads total dose; the irradiation in conjunction with the DVB effects crosslinking of the polypropylene, increasing its viscoelastic strength at temperatures above its melting point. The azobisformamide constituent makes the material expandable at temperatures above its decomposition temperature (about 196°).

The demonstration permeable mold of Example 1 is charged with 9.1 grams of the cubes, and the mold is immersed for 90 seconds in the molten salt bath of Example 1 at temperature 250° C, then removed, washed and cooled in water, and opened. Good molding, conforming to and filling the mold cavity, is obtained, the cellular product having average density about 0.08 g/cc.

EXAMPLE 6

A mixture of 600 parts styrene, 200 parts acrylonitrile (comonomer), 0.571 part divinylbenzene (98% meta-isomer) (comonomer and crosslinking agent), 3.2 parts isopropyl percarbonate (polymerization catalyst), 0.8 part benzoyl peroxide (polymerization catalyst), and 89 parts finely powdered azobisformamide (thermally decomposable blowing agent) is bulk or mass polymerized in a tumbling reactor (3 turns per minute) for 6 days at 40° C followed by one day at 100° C. The resulting hard, opaque yellow solid resin is cut in cubical pieces about 0.25 inch on edge.

The permeable mold described in Example 1 is charged with 7.5 grams of the above-described cubical pieces, closed and immersed in the molten salt bath as described in Example 1 at temperature 250° C for 2 minutes. The mold is then removed, cooled in water, and opened. The mold cavity is completely filled with cellular resin. The cellular molded cylinder weighs 7.5 g and has average density 0.066 g/cc. The starting cubes are expanded and well bonded together, eliminating interstitial space. The molding is substantially free of salt from the molten salt bath heating medium.

In another test, the same starting copolymeric resin composition above described in this example is cast into rods 0.75 inch in diameter, and the rods are cut into disks 0.2 inch thick (and 0.75 inch diameter). A charge of 7.5 grams of such disks is molded in the permeable mold and manner described by immersion for 2 minutes in the molten salt bath at 260° C. Results are obtained similar to those just described in this example. The appearance and properties of the foamed cellular cylindrical article made from the expandable disks are similar to those of the articles made from expanded cubes.

EXAMPLE 7

A mixture of 87 parts copoly(ethylene-vinyl acetate) (75/25) and 13 parts azobisformamide is prepared in a twin-screw mixing extruder at 150° C and extruded as 0.12 inch thick sheet. The sheet is irradiated with high energy electrons to 3.7 mrad dose and cut into cubes.

For this test, a mold similar in design to that described in Example 1 is made from thin metal tubing 5 cm in diameter by 5.1 cm long perforated on 1 cm centers with holes 1 mm in diameter. The ends are closed by disks in manner described for the mold in Example 1, forming a cylindrical mold cavity of about 100 ccs volume.

Using the molten salt bath and procedure described in Example 1, the mold containing a charge of 4.75 grams of the above-described cubes is immersed for 150 seconds in the molten salt bath at temperature 250° C. The resulting foam completely fills the mold cavity eliminating interstitial space. The cellular cylinder has average density 0.047 g/cc (about 2.9 pounds per cubic foot) and is relatively soft, flexible, tough, well bonded foam.

EXAMPLE 8

In this example there is used low density polyethlene having density 0.915 g/cc, MI 5.5 dg/min, weight-average molecular weight 202,000, number-average molecular weight 15,300. In a mixing extruder, 95 parts of such polyethylene is melted, mixed with 5 parts finely powdered azobisformamide, and extruded at 150° into solid strands 3 mm in diameter. The strands at room temperature are irradiated with 2 mev electrons to total dose of 3.5 mrads and cut into lengths about 2.5 to 5 cm. The strands are non-cellular, density 0.936 g/cc.

For this example, a permeable mold is made in flat disk shape having a cylindrical wall of stainless steel 0.6 mm thick, 12.1 cm diameter by 2.54 cm high closed with removable flat disk end plates of sheet brass about 1 mm thick. The mold walls, including end plates, are perforated with 1 mm holes on 1 cm centers. The interior of the mold is then lined with stainless steel wire screen, 100 mesh per inch plain weave.

A charge of 29 grams of the expandable strands hereinbefore described is placed in the permeable mold, which is closed, then immersed for 120 seconds in the molten salt bath described in Example 1 at temperature 245° C. After cooling in water, the mold is opened and the cellular disk molding is removed. The foamed polyethylene has fine closed cell structure. The molding weighs 28.6 grams, has average density 0.098 g/cc (about 6 pounds per cubic foot), and has molded surface which is a negative reproduction of the surface of the screen lining of the mold. The molded disk has no evidence of interstitial space remaining between the strands and no evidence of salt occluded within the foam body or trapped between the molding and the mold walls. The strandular nature of the starting expandable strands is discernible as elongated rambling subregions of the unitary foam disk product; these are fused together at their common boundary layers as the interstitial spaces are closed out during the foam expansion step. The resulting cellular article, interlaced with such fused boundary layers, is stronger and tougher than a similar cellular article of the same density which is expanded from a single expandable mass and which does not have such system of fused boundary layers.

EXAMPLE 9

For this Example, a mold was constructed to provide a bucket-shaped molding. Two standard steel beakers were selected, one about 4 inches in diameter and about 5 inches deep (outer volume 1128 cc) and the other about 5.5 inches in diameter and about 6.25 inches deep (inner volume 2468 cc). Each beaker was perforated with 0.020 inch diameter holes drilled 0.5 inch apart in rows 1 inch apart. An annular ring plate with inner and outer diameters of about 4.0 and 6.5 inches, respectively, having eight holes, each 0.1875 inch diameter, equidistant apart on a circle about 5.25 inches in diameter concentric in the annular ring was devised to be secured to the rims of the beakers. A plain annular ring of the same inner and outer diameters was cut from 40-mesh, plain weave, wire screen. The mold was assembled by placing the smaller beaker concentrically within the larger beaker with their respective rims in a common plane secured to the annular plate, with the screen ring lying between the beaker rims and the plate, to enclose an annular space between the beakers as a mold cavity of about 1340 cc.

Also for this example a grid-like array of expandable plastic particles was prepared using polyethylene (density 0.915 g/cc and MI 5.5) composition containing 6 w% azobisformamide blowing agent. By compression molding between specially designed platens at a temperature below the decomposition temperature of the blowing agent, the composition was molded into numerous spheres, each 0.25 inch diameter, in a square grid of rows about 0.375 inch apart, the centers being in a plane between the mating surfaces of the mold plates. In such plane, between the mold plates and in grooves cut therein, steel wires 0.006 inch in diameter had first been strung in two parallel arrays, perpendicular to each other, with the wires in each being 0.375 inch apart, so that their intersections were centered in the spherical mold cavities. The resulting molded product was a sheet of 0.25 diameter spherical beads of expandable material arrayed in a square grid pattern with their centers about 0.375 inch apart and interconnected with perpendicular thin steel wires passing through their centers. Such sheets of wire-connected particles were then irradiated with $\beta$-radiation to a dose of 4.5 mrads to effect crosslinking of the polyethylene.

The annular mold cavity of the concentric beaker mold previously described in this example was charged with such sheets of interconnected spheres in amount of 168 grams, the mold was closed and immersed in molten salt of the kind described in Example 1 at temperature of 220° C, held therein for 5 minutes, then removed, cooled, washed with water and opened. The resulting molded articles conformed to the mold cavity. The starting spheres had expanded and fused together forming a unitary molding in the shape of a thick-walled beaker having fine closed cell structure of average density about 8 pcf and having the starting thin steel wires running in all directions through the cellular structure.

EXAMPLE 10

Example 9 was repeated except that the thin steel wires were replaced with glass fiber strands (0.02g per foot) so that the starting expandable spheres were interconnected in the grid patterned sheets by such glass fiber strands. Similar results were obtained except that the cellular molding had such glass fiber strands running through the cellular structure.

EXAMPLE 11

In this example, a molding was made from partially pre-foamed, foamable thermoplastic pieces.

Polyethylene having 0.915 g/cc density and Melt Index 5.5 was compounded with 5 parts of azobisformamide per hundred of the polyethylene and extruded (without decomposing the azobisformamide) into cylindrical pellets about 8 mm diameter by 10 mm long. The pellets were then irradiated with $\beta$-rays to about 5 mrad dose to effect crosslinking of the polymer. The irradiated pellets were then partially foamed by immersing the loose pellets, without confinement, in molten salt of the kind described in Example 1, at 230° C for 90 seconds, then removing and quenching them quickly in cold water. The individual pellets expanded about 4-fold in volume to cellular pieces having density about 0.24 g/cc.

A charge of 197 g of such pre-expanded pieces was placed in the mold cavity of the concentric beaker mold described in Example 9, loosely filling the mold cavity. The mold was closed and immersed in molten salt of the kind described in Example 1, at 260° C for 3 minutes, then removed, cooled, washed with water and opened. The resulting thick-walled beaker-shaped molding, weighing 195 g when dry, had foam density of about 9 pcf and substantially uniform small closed cells.

EXAMPLE 12

A mold was constructed to make "dog bone" tensile bar moldings which are overall 2 inches wide by 4 inches long by 0.5 inch thick. In plan, both side edges taper inwardly at 45% angle on straight lines from points one inch from each end to a square mid-section one inch wide by one inch long. The edge wall of the mold was made of brass, pierced with 0.040 inch diameter holes on 0.5 inch centers, held between parallel flat top and bottom plates of porous steel which were bolted together to enclose the mold cavity.

A composition of polyethylene like that of Example 11 having 5 pph azobisformamide was compression molded in the manner described in Example 9 into a grid-like array of 0.25-inch diameter spheroidal beads in rows 0.375 inch apart on centers. An array was so made in which the beads were interconnected with 6-mil diameter "Nichrome" (TM) wire running through their centers in two parallel sets perpendicular to each other in the plane of the bead centers. Another such array was made in which the beads were similarly interconnected with glass fiber strands having dimensions of about 0.02 g/ft. Yet another such array was made in which no such wire or glass fiber was used but the thermoplastic material flowed into the grid grooves of the mold platens to make an array in which the beads were spaced apart and interconnected by thin strands of the same composition in a square grid pattern. The grid moldings were then irradiated to dose of 4 mrad with $\beta$-radiation to crosslink the polymer.

Pieces of the resulting several grid arrays of foamable material were cut to fit the tensile bar mold cavity described above, and they were individually placed in the mold. The mold was closed, immersed in molten salt of the kind described in Example 1 at 230° C for two minutes, removed, cooled and washed with water and opened. The resulting bar moldings had foam density of about 6 pcf.

The resulting bars were tested for tensile properties with results as follows:

| Sample No. | Filament | Tensile Strength Break, psi | Elongation % |
|---|---|---|---|
| A | Plastic* | 49.2 | 23 |
| B | " | 52.6 | 25 |
| C | " | 51.9 | 24 |
|   |   | Avg. 51.2 | Avg. 24 |
| D | Wire | 51.8 | 21 |
| E | " | 51.8 | 21 |
| F | " | 54. | 23 |
|   |   | Avg. 52.5 | Avg. 22 |
| G | Glass | 63.4 | 26 |
| H | " | 60.0 | 25 |
| I | " | 61.4 | 27 |

-continued

| Sample No. | Filament | Tensile Strength Break, psi | Elongation % |
|---|---|---|---|
| | | Avg. 61.6 | Avg. 26 |

*Integral composition with that of starting beads; a control.

Further examination showed that the plastic foam had not bonded to the "Nichrome" wires which were easily pulled out and did not add tensile strength to the foam test bars in Samples D, E and F. Some adhesion or friction of foam to the glass fiber strands was obtained in the molding of Samples G, H and I, and this condition is reflected in the significantly higher tensile strength of such foam test bars as compared to the control Samples A, B and C.

In place of the particular salt mixtures employed in the foregoing examples, there can be used other low-melting salt mixtures as hereinbefore described, particularly mixtures of the nitrate and nitrite salts of lithium, sodium, potassium, calcium and magnesium.

COMPARATIVE TESTS

For purposes of comparison, but not exemplary of the invention, tests were carried out using silicone oil as the heat transfer medium.

In these tests, an array of beads like that described in Example 12 for Samples A, B and C was made without wire or glass fiber, i.e., beads interconnected by thin strands of the same composition as the beads, and pieces thereof were placed in the "dog-bone" tensile bar mold described in that Example 12.

In these comparative tests, the charged mold was then immersed into a bath of silicone oil at 230° C (note the same temperature as in Example 12). Immersion time was required to be four minutes before the resin foaming was complete, in contrast to the two minutes time used in Example 12. After the mold was removed from the silicone oil bath, problems arose in cooling and cleaning the mold and the molding. Cooling in air was slow, and freeing the molding of silicone oil was virtually impossible. Cooling the withdrawn mold in cold water (compare Example 12) caused the formation of a water-silicone oil mixture on the mold and surface of the molding which was even more difficult to remove; even after careful wiping and thorough blowing out of the empty mold with air between tests, the porous metal plate members of the mold contained enough residual water to cause possibly dangerous sputtering when again immersed in the hot silicone oil in a subsequent test.

Three test sample moldings were thus obtained and found to have cellular structure and approximately 6 pcf density. Their tensile strengths were tested and found to be 67, 58 and 48 psi, respectively, indicating lack of uniformity. Their elongations at break were 21, 26 and 15%, respectively, further indicating lack of uniformity. It was obvious on inspection that the foam moldings were contaminated with silicone oil, and it appeared that the resin had been partially plasticized by the oil.

These comparative tests demonstrated that, in contrast to the invention, molding of expandable polymer compositions in permeable molds by immersion in hot silicone oil is slower and more objectionable, heat transfer is less efficient, it takes longer (here twice as long) to fully expand the material in the mold, there is no good way to cool the mold or molding after removal from the silicone oil bath, there is no good way to clean up the molded foam article, and the molded articles are contaminated, possibly plasticized, with silicone oil, and are not uniform.

In contrast, molding by immersion in molten salt in accordance with this invention is advantageous in that the heat transfer is fast and efficient, cycle times are shorter, cooling in water is quick, easy and effective, the molds are easily cleaned for re-use, the moldings are easily and effectively washed free of salt, are not contamined or plasticized thereby, and are successively uniform.

The foregoing examples of the invention illustrate making shaped articles of cellular organic resins by heating expandable thermoplastic polymer compositions in a mold that is permeable to fluids by flooding the mold cavity and heating the expandable material therein with molten salt. For purposes of illustration and demonstration, the permeable molds used in the Examples are simple in design and produce articles of simple shape, but it is apparent that other articles of other shapes are obtained in permeable molds of corresponding shape in the manner of this invention. Thus, molded articles are made according to this invention in the nature of packaging containers and inserts, pads and like components of athletic equipment, flotation devices, seat, floor, wall and like cushioning, beverage and like coolers, automobile and like vehicle parts such as visors, instrument panel components, bumpers and bumper inserts, etc, where the cellular plastic structure is desired for lightness, insulation or impact energy absorption properties in useful articles.

What is claimed is:

1. A method of making shaped articles of organic polymer resins having a cellular structure by molding heat-expandable thermoplastic resin in a mold having a mold cavity, which comprises charging into the mold cavity a heat-expandable normally solid thermoplastic resin material comprising a normally solid thermoplastic resin component and a blowing agent, said resin material being in the form of discrete pieces or segments, and flooding the mold cavity and the said pieces or segments of resin material therein with a molten salt, which salt melts to a stable liquid and is maintained at a temperature which is above the softening and expansion temperatures of said resin material and wherein said resin component is self-supporting at the molten salt temperature, and wherein the mold walls defining the mold cavity are permeable to the flow therethrough of fluids but not of the resin therein, said pieces or segments of said heat-expandable resin material being charged to the mold cavity in amount capable of free expansion at the temperature of said molten salt to volume at least 110% of the volume of said mold cavity, whereby said pieces or segments of said expandable resin material are heated by the molten salt and expand, and the resulting expanding pieces or segments force the molten salt from the mold cavity and adhere together, and the resulting expanded cellular resin material substantially fills the cavity, then cooling the mold and the resulting shaped article therein and removing from the mold the resulting integral shaped article of resin having a cellular structure.

2. The method of claim 1 wherein said molten salt is a mixture comprising potassium nitrate and sodium nitrite.

3. The method of claim 2 wherein said molten salt is a substantially eutectic melting mixture of potassium nitrate, sodium nitrite and sodium nitrate.

4. The method of claim 1 wherein said heat-expandable thermoplastic resin material comprises an olefin polymer and a heat-sensitive, decomposable chemical blowing agent.

5. The method of claim 1 wherein said heat-expandable thermoplastic resin material comprises polyethylene and azobisformamide.

6. The method of claim 5 wherein said molten salt is a mixture comprising potassium nitrate and sodium nitrite at temperature from about 150° to about 350° C.

7. The method of claim 6 wherein said mold cavity is flooded with the molten salt and the heat-expandable resin material is thereby heated to effect expansion thereof by immersing said mold cavity in a body of said molten salt.

8. The method of claim 1 wherein the starting charge of said heat-expandable normally solid thermoplastic resin material also comprises a pre-expanded cellular portion.

9. The method of claim 1 wherein said heat-expandable thermoplastic resin material comprises a crosslinked ethylene polymer and up to about 20 weight percent finely dispersed azobisformamide blowing agent and is capable of free expansion at the molten salt temperature in volume at least about 1.5-fold, and is charged to said mold cavity in amount capable of such free expansion at the molten salt temperature to volume at least 110% of the volume of said mold cavity, and wherein said molten salt is a mixture comprising potassium nitrate and sodium nitrite maintained at temperature from about 150° to about 350° C.

10. The method of claim 1 wherein said heat-expandable thermoplastic resin material comprises a crosslinked styrene polymer.

11. The method of claim 10 wherein said crosslinked styrene polymer is crosslinked with divinylbenzene and said blowing agent is finely dispersed azobisformamide.

12. The method of claim 10 wherein said crosslinked styrene polymer is crosslinked with divinylbenzene and said blowing agent is a volatile liquid.

13. The method of claim 12 wherein said crosslinked styrene polymer is a copolymer of styrene and acrylonitrile.

14. The method of claim 1 wherein said heat-expandable thermoplastic resin material comprises crosslinked polypropylene and said blowing agent is finely dispersed azobisformamide.

* * * * *